US011975384B2

United States Patent
Moodie et al.

(10) Patent No.: US 11,975,384 B2
(45) Date of Patent: May 7, 2024

(54) CASTING MOULD

(71) Applicant: Foundry Lab Limited, Wellington (NZ)

(72) Inventors: David John Moodie, Wellington (NZ); William Robert Wiles, Wellington (NZ); Lance Molyneaux, Lower Hutt (NZ); Joshua Joseph Mcintosh, Wellington (NZ)

(73) Assignee: Foundry Lab Limited, Wellington (NZ)

( * ) Notice: Subject to any disclaimer, the term of this patent is extended or adjusted under 35 U.S.C. 154(b) by 2 days.

(21) Appl. No.: 17/629,324

(22) PCT Filed: Jul. 20, 2020

(86) PCT No.: PCT/NZ2020/050071
§ 371 (c)(1),
(2) Date: Jan. 21, 2022

(87) PCT Pub. No.: WO2021/015626
PCT Pub. Date: Jan. 28, 2021

(65) Prior Publication Data
US 2022/0250138 A1    Aug. 11, 2022

Related U.S. Application Data

(60) Provisional application No. 62/877,256, filed on Jul. 22, 2019.

(51) Int. Cl.
*B22C 9/06* (2006.01)
*B22D 23/06* (2006.01)
*B33Y 80/00* (2015.01)

(52) U.S. Cl.
CPC .............. *B22C 9/061* (2013.01); *B22C 9/065* (2013.01); *B22D 23/06* (2013.01); *B33Y 80/00* (2014.12)

(58) Field of Classification Search
CPC .......... B22C 9/061; B22C 9/065; B22C 9/04; B22C 9/043; B22C 9/046; B22D 23/06; B22D 27/02; B22D 27/04
See application file for complete search history.

(56) References Cited

U.S. PATENT DOCUMENTS 1,070,500 A    8/1913  Mackenzie
1,659,638 A    2/1928  Shapiro
(Continued)

FOREIGN PATENT DOCUMENTS

EP    0583124 A2    2/1994
EP    3210691 A1    8/2017
(Continued)

OTHER PUBLICATIONS

Foreign Communication From a Related Counterpart Application, International Search Report and Written Opinion dated Oct. 30, 2020 International Application No. PCT/NZ2020/050071 filed on Jul. 20, 2020.

(Continued)

*Primary Examiner* — Kevin P Kerns
*Assistant Examiner* — Steven S Ha
(74) *Attorney, Agent, or Firm* — Conley Rose, P.C.

(57) ABSTRACT

A casting mould comprising: an inorganic or refractory mould, wherein the mould is configured to receive feedstock; wherein the feedstock is configured to be heated in situ. A reusable mould, reusable susceptor, and/or release agent may be incorporated. Method of manufacturing a mould, and casting a part employing 5 in situ heating, are also provided.

20 Claims, 8 Drawing Sheets

(56) References Cited

U.S. PATENT DOCUMENTS

| | | |
|---|---|---|
| 1,812,172 A | 6/1931 | Rohn |
| 2,083,022 A | 6/1937 | Hoke |
| 2,305,071 A | 12/1942 | Fahlman |
| 2,490,193 A | 12/1949 | Barr |
| 2,521,520 A | 9/1950 | Jancura |
| 2,782,476 A | 2/1957 | Brennan |
| 2,806,271 A | 9/1957 | Operhall |
| 2,961,751 A | 11/1960 | Operhall |
| 3,204,301 A | 9/1965 | Flemings et al. |
| 3,309,738 A | 3/1967 | Friedman |
| 3,376,915 A | 4/1968 | Chandley |
| 3,405,220 A | 10/1968 | Barrow et al. |
| 3,417,809 A | 12/1968 | Sink |
| 3,435,878 A | 4/1969 | Howard et al. |
| 3,598,168 A | 8/1971 | Clark et al. |
| 3,620,289 A | 11/1971 | Phipps, Jr. et al. |
| 3,712,364 A | 1/1973 | Daniel et al. |
| 3,788,382 A | 1/1974 | Daniel et al. |
| 3,847,205 A | 11/1974 | Soykan et al. |
| 3,861,449 A | 1/1975 | Barbero |
| 3,955,612 A | 5/1976 | Schultheiss |
| 4,013,115 A | 3/1977 | Sellors et al. |
| 4,307,769 A | 12/1981 | Hauser et al. |
| 4,330,698 A | 5/1982 | Sawada et al. |
| 4,573,516 A | 3/1986 | Quested et al. |
| 4,655,276 A | 4/1987 | Bird et al. |
| 4,867,224 A | 9/1989 | Wakita et al. |
| 5,053,090 A | 10/1991 | Beaman et al. |
| 5,147,587 A | 9/1992 | Marcus et al. |
| 5,168,917 A | 12/1992 | Okuda et al. |
| 5,204,055 A | 4/1993 | Sachs et al. |
| 5,343,024 A | 8/1994 | Prosise et al. |
| 5,387,380 A | 2/1995 | Cima et al. |
| 5,490,882 A | 2/1996 | Sachs et al. |
| 5,584,419 A | 12/1996 | Lasko |
| 5,775,402 A | 7/1998 | Sachs et al. |
| 5,788,916 A | 8/1998 | Caldarise |
| 6,155,331 A | 12/2000 | Langer et al. |
| 6,353,771 B1 | 3/2002 | Southland |
| 7,011,136 B2 | 3/2006 | Moore et al. |
| 7,533,713 B2 | 5/2009 | Pfeifer et al. |
| 7,541,561 B2 | 6/2009 | Thyssen et al. |
| 7,708,929 B2 | 5/2010 | Monsheimer et al. |
| 7,832,456 B2 | 11/2010 | Calnan et al. |
| 8,211,226 B2 | 7/2012 | Bredt et al. |
| 9,375,782 B2 | 6/2016 | McBrien et al. |
| 9,381,564 B2 | 7/2016 | McGuire et al. |
| 9,452,474 B2 | 9/2016 | Xu |
| 9,475,118 B2 | 10/2016 | Mironets et al. |
| 9,901,977 B2 | 2/2018 | Bohra et al. |
| 10,279,628 B2 | 5/2019 | Seljan et al. |
| 2004/0081573 A1 | 4/2004 | Newell |
| 2004/0152581 A1 | 8/2004 | Bardes et al. |
| 2005/0247429 A1* | 11/2005 | Turkington ............. B22C 7/026 164/516 |
| 2005/0252631 A1 | 11/2005 | Bardes et al. |
| 2009/0239023 A1 | 9/2009 | Olin et al. |
| 2012/0228803 A1 | 9/2012 | Smoke et al. |
| 2013/0213955 A1 | 8/2013 | Jussel et al. |
| 2016/0193651 A1 | 7/2016 | Orange et al. |
| 2016/0193653 A1 | 7/2016 | Ashton et al. |
| 2017/0326623 A1 | 11/2017 | Wowezuk et al. |
| 2018/0265417 A1 | 9/2018 | Champion et al. |
| 2018/0370078 A1 | 12/2018 | Haibach et al. |
| 2019/0001404 A1 | 1/2019 | Yang et al. |
| 2019/0001406 A1* | 1/2019 | Wu .................. B22C 9/082 |

FOREIGN PATENT DOCUMENTS

| | | |
|---|---|---|
| FR | 2320818 A1 | 3/1977 |
| GB | 991240 A | 5/1965 |
| GB | 1234497 A | 6/1971 |
| GB | 2516990 A | 2/2015 |
| GB | 2516991 A | 2/2015 |
| GB | 2516992 A | 2/2015 |
| GB | 2523583 B | 9/2016 |
| JP | S59-218256 A | 12/1984 |
| JP | S60-227965 A | 11/1985 |
| JP | H0299261 A | 4/1990 |
| JP | H04-294857 A | 10/1992 |
| JP | 2003050614 A | 2/2003 |
| JP | 2004306044 A | 11/2004 |
| JP | 2007083264 A | 4/2007 |
| WO | 2000000311 A1 | 1/2000 |
| WO | 2019122797 A1 | 6/2019 |
| WO | 2021015626 A1 | 1/2021 |

OTHER PUBLICATIONS

Foreign Communication From a Related Counterpart Application, International Preliminary Report on Patentability dated Nov. 8, 2021 International Application No. PCT/NZ2020/050071 filed on Jul. 20, 2020.

Foreign Communication from a Related Counterpart Application, Extended European Search Report dated Apr. 5, 2022, European Application No. 20844008, filed on Jul. 20, 2020.

Voigt, et al., "3D Printed Sand Molds-An Opportunity for Investment Casters", 65th Annual ICI Technical Conference, Kansas City, MO, Oct. 21-24, 2018, uploaded on Oct. 23, 2018, 15 pages.

Chen, et al., "3D printing of ceramics: A review", Journal of the European Ceramic Society 39 (2019) 661-687, https://doi.org/10.1016/j.jeurceramsoc.2018.11.013, 27 pages.

3d Printing Service: From the Idea To Finished Castings With Voxeljet, https://www.voxeljet.com/materialien/guss/, Jun. 19, 2019, 5 pages.

Bredt, "Binder Stability and Powder/Binder Interaction in Three Dimensional Printing", Thesis submitted to the Department of Mechanical Engineering in Partial Fulfillment of the Requirements for the Degree of Doctor of Philosophy at the Massachusetts Institute of Technology Jan. 1995, 385 pages.

Castings—Patternless process offers design freedom, improved efficiency and eliminates storage, https://www.exone.com/Industries-Applications/Applications/Castings, Jun. 19, 2019, 2 pages.

Cima, "Plenary Lecture—Ceramics Manufacturing-from Science to Practice", International J. of The Soc. of Mat. Eng. for Resources vol. 3, No. 1, 5-10 (1995), Received Sep. 7, 1994 by Ceramics Processing Research Laboratory, Materials Processing Center, Massachusetts Institute of Technology, Cambridge, MA, 6 pages.

Chandrasekaran, et al., "Experimental and theoretical investigation on microwave melting of metals", Journal of Materials Processing Technology 211 (2011) 482-487, 6 pages.

Chandrasekaran, et al., "Microwave heating characteristics of graphite based powder mixtures", International Communications in Heat and Mass Transfer 48 (2013) 22-27, 6 pages.

Snelling, et al., "The Effects of 3D Printed Molds On Metal Castings", Design, Research, and Education for Additive Manufacturing Systems Laboratory; Department of Mechanical Engineering, Department of Material Science, Virginia Tech, Blacksburg, VA, 2013, 19 pages.

Sachs, et al., "Three Dimensional Printing: Rapid Tooling and Prototypes Directly from CAD Representation", Massachusetts Institute of Technology Cambridge, Massachusetts, Oct. 9, 1990, 26 pages.

\* cited by examiner

CASTING MOULD

FIELD

This invention relates to a casting mould, for example a reusable casting mould that may be used in the production of parts.

BACKGROUND

Prior art methods of short run production of metal parts may be expensive or slow. Where such parts are used for Research and Development (R&D) or prototyping it may be desirable for such parts to be produced cheaply, quickly, repeatably, reliably, with a wide range of shapes, with a wide range of metals or alloys, or scalably.

SUMMARY

According to one example embodiment there is provided a casting mould, a clamping system, a 3D printer, a microwave transmitter, a system, a part, or a method.

Embodiments may be implemented according to any one of the dependent claims.

It is acknowledged that the terms "comprise", "comprises" and "comprising" may, under varying jurisdictions, be attributed with either an exclusive or an inclusive meaning. For the purpose of this specification, and unless otherwise noted, these terms are intended to have an inclusive meaning—i.e., they will be taken to mean an inclusion of the listed components which the use directly references, and possibly also of other non-specified components or elements.

Reference to any document in this specification does not constitute an admission that it is prior art, validly combinable with other documents or that it forms part of the common general knowledge.

BRIEF DESCRIPTION OF THE DRAWINGS

The accompanying drawings which are incorporated in and constitute part of the specification, illustrate embodiments of the invention and, together with the general description of the invention given above, and the detailed description of embodiments given below, serve to explain the principles of the invention, in which.

DETAILED DESCRIPTION

Figure 1:
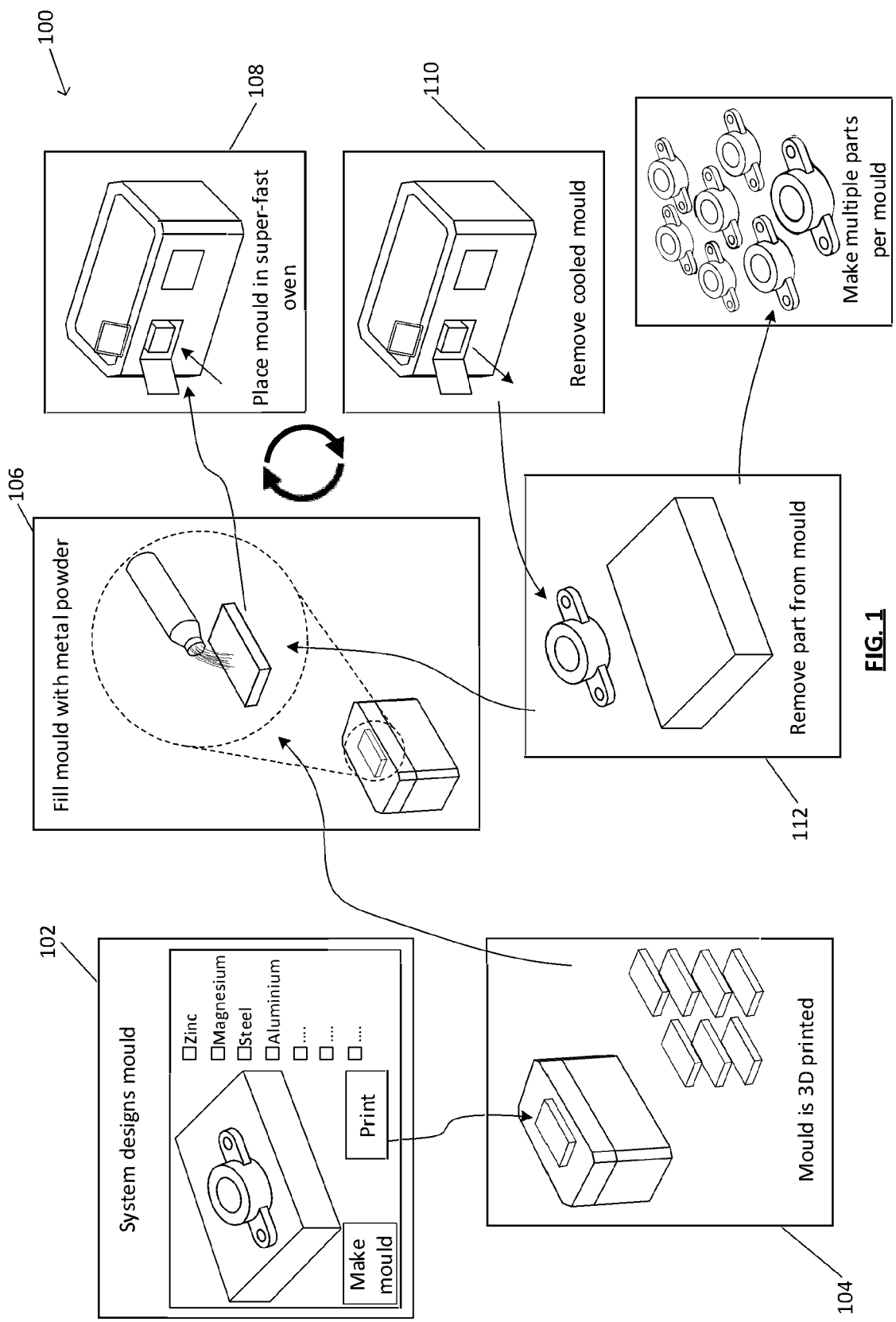
FIG. 1 is a schematic diagram of a system for metal casting.

FIG. 1 illustrates a system 100 for casting according to an example embodiment. In general terms there may be stages to the casting process, or stages may be combined or carried out in a different order according to the requirements of any given application. A mould is designed 102 for a specific part specification. Then an inorganic semi-permanent mould is printed on a 3D printer 104 using the mould design. The mould is filled with appropriate feedstock 106. The filled mould is energised by a wireless power source to in situ melt the feedstock 108. Alternatively, the feedstock could be melted by heating the filled mould using conventional means, for example a combustion furnace. The mould is cooled and removed from the wireless power source 110. The part within the mould can then be removed 112 and the mould can then be reused for subsequent casting if the application calls for reusability.

One or more embodiments may have the advantage that a mould may be quicker to 3D print, than the part in question. In any case, once printed, the mould can be used to quickly cast two or more parts.

In any embodiment where the moulds can be reused two or more times, the typical production time of each part may be reduced from 8 hours (or much longer for some methods) to as low as 10-15 minutes. An example system, such as shown in FIG. 1, may have a small footprint, operate stably, may be more efficient, provide an acceptable finish, may be fast and simple to train on and/or is low maintenance. One or more embodiments may be advantageous for the automotive, consumer goods, construction, equipment and machine, mining, aerospace, ship building and military industries.

The following terminology will be used throughout:

System An apparatus, method and/or software used in the casting process.

Consumable A raw material that is used by the System which may include: ceramic, susceptor, catalyst, release agent, binder, flux, additive, liquid, powder or metal.

Mould The printed and cured mould.

Investment Mould A single use Mould that cannot be opened without damaging the Mould.

Permanent Mould A Mould that can be reused many times.

Semi-Permanent Mould A Mould that can be reused two or more times, may also be referred to as a Reusable Mould. The number of times may depend on requirements of the applications e.g., the design of the Part, the required alloy, cost, time, level of after-mould finishing required (i.e.: grinding, filing, cutting polishing etc). The Mould may become unusable when the Mould no longer holds the molten metal without leaking. For automotive prototyping 10 (or more) separate casts may be appropriate.

Multipart Mould A Reusable Mould with 2 or more parts.

Mould Cavity A negative detail or hollow in the Mould that is filled with feedstock during casting. It shapes the external surface of the Part.

Mould Core A positive feature in a Mould that forms a void in the final Part. A core may be reusable or single use. It shapes the internal surface of the Part.

Mould Impression The void of the Mould formed by the Mould Cavity, the Mould Core and any other Mould parts.

Interior Surface The interface between the Mould Impression and the Mould Cavity, the Mould Core and any other Mould parts.

External Surface The visible surface of the Mould when the Mould Cavity, the Mould Core and any other Mould parts are assembled.

Feedstock A consumable including powder, particle, granules, wire, ingots, or mixtures. For example, it may be predominantly metallic components.

Inorganic Mould A Mould formed from an inorganic material such as a refractory material, including Metal or Ceramic.

Ceramic A consumable including a liquid, solid, composite solid or powder able to withstand thermal shock, compatible with metal (unless a barrier layer is used), and has a Maximum Service Temperature depending on the material of the part in question. For example, for a Low Temperature Metal a Maximum Service Temperature of at least 1000° C. may be required.

Binder A consumable including a liquid, solid or powder to assist the forming of a Mould.

Susceptor A consumable including a liquid or powder to assist in the in situ generation of heat within the Mould Impression.

Release Agent A consumable including a liquid or powder to assist removal of a Part from the Mould after the melted Feedstock solidifies. May include, or also function as, a barrier layer. Alternatively, the barrier layer may be separate.

Mould Identifier An identifier of the mould or its properties, for example a temperature resistant RFID, a temperature resistant NFC, a QR code, ID tag or a barcode attached to, embedded in or printed on the mould.

Station The device or hardware at different functional locations in the System e.g., a printer, metal feedstock dispenser, microwave, or cooling station.

Furnace The station with one or more Wireless Power Sources for heating and/or associated cooling drawers.

Part The output of the system.

Printer A 3D Printer and/or associated equipment.

In Situ Heating Feedstock is heated within the Mould.

Wireless Power Source may include electromagnetic power transmission, Microwave power transmission, Inductive power transmission, RF power transmission, Capacitive power transmission or Dielectric power transmission.

Microwave Electromagnetic radiation having a frequency of between 300 MHz and 300 GHz, for example 5.725 GHz and 5.875 GHz, 2.4 and 2.5 GHz, or between 902 and 928 MHz.

RF Radio frequency electromagnetic radiation having a frequency of between 30 Hz and 300 GHz.

Inductive Wireless power transmission using a predominantly magnetic field.

Capacitive Wireless power transmission using a predominantly electric field.

Maximum Service Temperature able to withstand a maximum temperature during a casting cycle without cracking, charring, shrinking, distortion, burning, melting or structural failure. A different temperature value may be used depending on the requirement of the application. For example, for the Mould it might be 1000° C., 1200° C., or 1450° C., whereas for the clamping system it might be 200° C.

Wireless Power Transmissive able to pass wireless power without appreciable power loss, or localised heating, but depending on the application. In the case of microwave transmission, a loss tangent (tanδ) of $10^{-3}$ or less is considered transmissive at least for the Mould, although different values may be used depending on the requirement of the application. For example, the clamping system may be able to accept a higher tanδ so long as it retains mechanical integrity or does not breach the Maximum Service Temperature for the Mould. Alternatively, the term wireless power transparent may be used.

Low Temperature Metal A metal or alloy with a melting point of less than 1000° C.

Density May be either an absolute measure such as Mol/mm$^3$ or a relative concentration measure such a proportion by molecular weight of ceramic vs susceptor at any point across a cross section of the Mould (or at a given distance from the Mould internal surface), or, compared to the portion of the total volume of susceptor used in the Mould.

Solidifies When molten metal or Feedstock makes a state transition to a solid.

Mould Design

Figure 2:
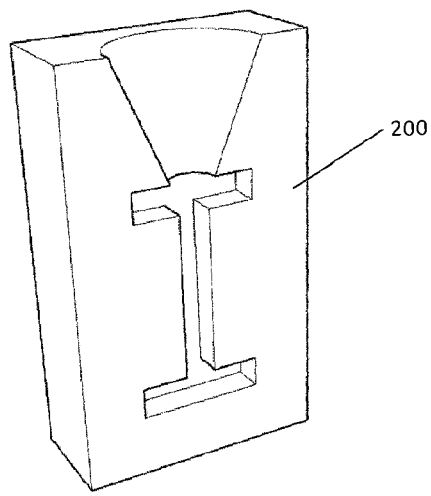
FIGS. 2 to 7 are cross sectional views of alternative mould topographies.

The step of Mould design 102 in FIG. 1, may be implemented using a Multipart Mould 200 as shown in FIG. 2, or a single-use complex design (or Investment Mould) which cannot be made with split moulds. In this case the Mould is broken after cooling and the part removed. The Mould may be designed in CAD software or according to the requirements of the application.

Another possibility is to make tools for the plastic injection moulding (PIM) market. An advantage of one or more embodiments over CNC machining may be to make metal tools with integral internal conformal cooling channels. The ability to cool the metal tools may reduce turnaround time, allows rapid or controlled cooling of the plastic, improved part quality and/or production volumes. PIM moulds could be cast by the System or copper could be cast to make electrodes for spark erosion of tooling steel Moulds both of which may be made more easily than CNC machining.

The 3D Printer will be able to print using multiple print heads to print binder, susceptor, ink and possibly release agent, or using a single print head capable of printing multiple materials. The printed material may include a Mould Identifier on the Mould which will inform a user of those details when scanned by a suitable reader which may include: ID tag, specific Feedstock, volume/mass of Feedstock required, instructions for the Furnace, how many times the Mould has been used, where in the process the Mould is, and what the current condition of the Mould is.

Mould Printing

The step of Mould printing 104 in FIG. 1, may be implemented using a local 3D printer. The Printer may use the binder jetting technique. Alternatives may depend on the application, for example Digital Light Processing (DLP) printed or Selective Laser Sintering (SLS). This may be implemented according to the disclosure in U.S. Pat. No. 5,204,055, or US2016193653 the contents of which are incorporated herein by reference.

In some embodiments the Printer may print the mould out of a powder which is able to retain its integrity by withstanding multiple melts at different melt temperatures for a range of Feedstocks. Gypsum with a powdered PVA binder that is activated by spraying with water through the print heads is one option for the moulds. Another option is silica powder with a grain size of between 50 and 600 mesh. Spherically shaped grains may flow better on the print table, but irregular shaped grains may perform well too. Alumina powder and others are possible depending on the requirements of the application. Silica may be more compatible with a wider range of molten metals (resists wetting and is non-reactive). Silica powder/binder blend is hydroscopic the powder may need to be kept in airtight containers or otherwise protected from water absorption. In some embodiments the Printer will avoid using nano aluminium powder, which may be undesirable in some applications.

Other examples of ceramics include: Zircon/Zirconia-based, Graphite, Silicon nitride, or Boron nitride.

In order to hold the ceramic powder in the desired shape we may use a binder. These are typically in a dry, powdered form and are mixed into the ceramic powder. Liquid binder may be printed rather than using it in the powdered form on the print bed.

Other Binders may include an inorganic colloidal solutions or high temperature inorganic binders such as sodium silicate potassium silicate, aluminium-phosphate, silicone resins and hydraulic-setting cements.

Figure 3:
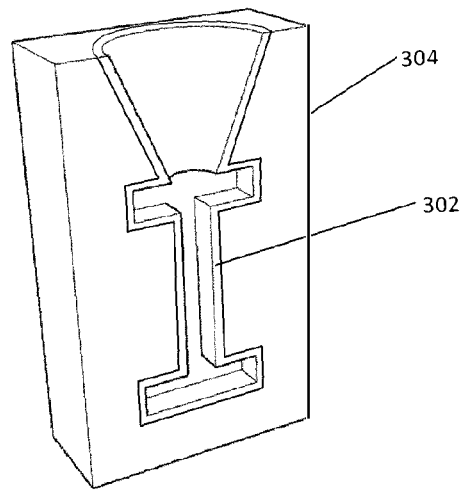
Figure 4:
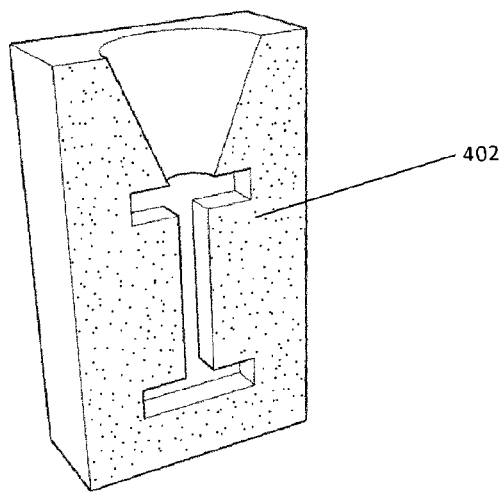
Figure 5:
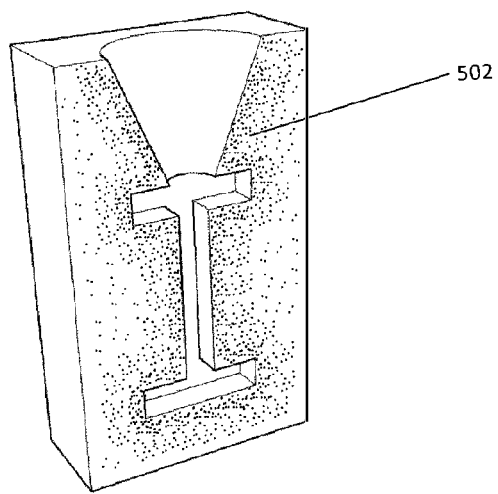
Figure 6:
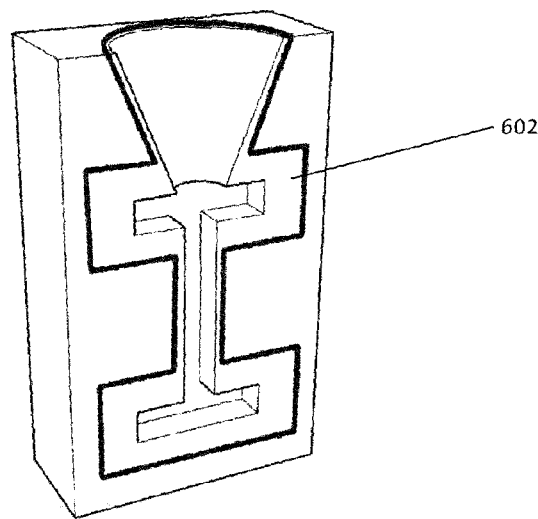
Figure 7:
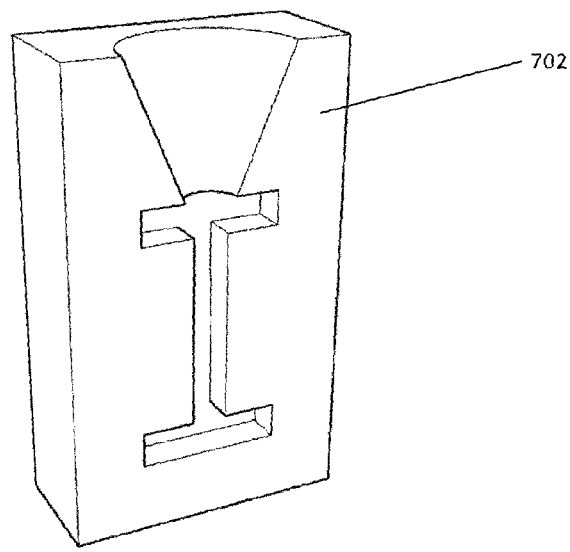

In some embodiments the Printer may print a susceptor 302 in the Mould parts 304 as shown in FIG. 3. Alternatively, a susceptor can be painted, sprayed, sputtered, dipped or deposited directly onto the Inner Surface of the Mould. Susceptor could be directly printed through the print heads by using nano scale particles similar to pigments in ink. The susceptor generates temperatures able to melt Feedstock when exposed to wireless energy delivered by the Wireless Power Source. In addition, the susceptor may also keep the heating surface in contact with the metal allowing the Mould to perform as an excellent insulator (for safety and faster, more efficient melting etc), avoid the risk of the metal particles arcing and damaging the Furnace (e.g., in case of Microwave) and/or the Mould. Ideally the susceptor is printed in a way that reduces the amount necessary and that it does not heat up in a way that damages the Mould or the Feedstock. The susceptor 402 may be spread evenly throughout the Mould as shown in FIG. 4 or varying the susceptor distribution 502 as shown in FIG. 5, so that it is concentrated near the internal surface of the Mould and decreasing in density as it gets closer to the exterior surface to allow controlled heating of the Mould body and avoid thermal shock or printed in a more complex way to provide a shield around the part. There may be a susceptor layer at different depths (compared to the Interior Surface of the Mould) at different locations in the Mould as shown in FIG. 6, to minimise thermal shock or thermal stress in complex part of the Mould, such as crevices. In a further alternative as shown in FIG. 7, the Mould 702 may be completely formed by a susceptor material or the ceramic and/or binder may have susceptor characteristics (either at certain temperatures or in general).

Figure 13:
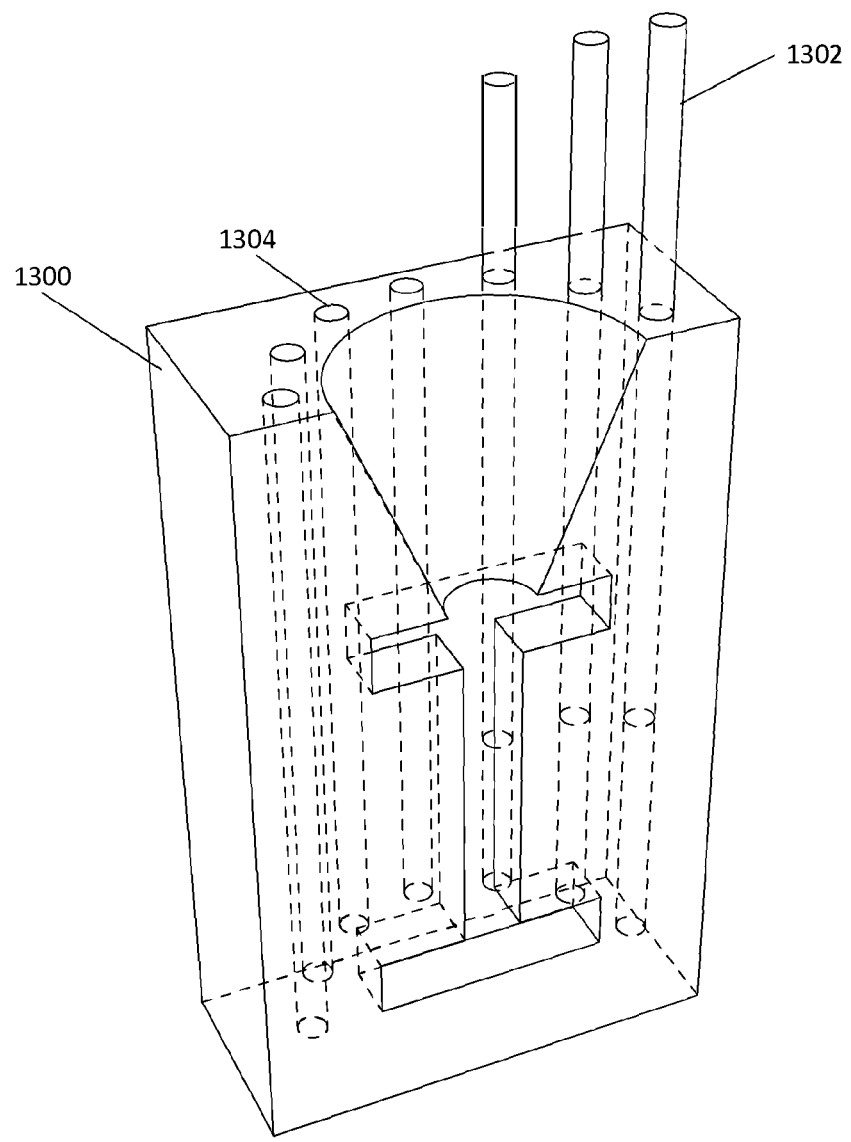
FIG. 13 is a cross sectional view of an alternative mould and susceptor system.

In another alternative example, shown in FIG. 13, the mould 1300 is printed with one or more voids 1304 in it. Susceptor material 1302 can then be placed into the voids. The susceptor 1302 may be in particulate form that is poured into the voids 1304 or may be a solid preformed shape that is inserted into the voids 1304. In the example shown in FIG. 13 the susceptor 1302 is in the form of rods. In this example, the mould 1300 does not need to include any other susceptor or be printed from a susceptor material. This means that the choice of materials for the mould 1300 is greater so that the base material for making the mould 1300 can be selected for optimal compatibility with the feedstock. It may also allow the use of lower cost base materials for the mould 1300. This arrangement may also have improved resistance to thermal shock.

The susceptor materials may include Graphite, magnetite, ferrite, silicon carbide, metal oxides, zirconia, Alumina, metallised film, water, molybdenum, stainless steel or any conductive material, depending on the requirements of the application.

In some embodiments a Release Agent maybe provided on the inner most surface of the Mould. This allows easy extraction of the part but may also provide a barrier if certain alloys react to the susceptor/ceramic. This may be printed, similar to the susceptor, coated post printing or mixed with a liquid susceptor to give a hybrid coating. Graphite powder may work well for some metals. Mould life may improve with the use of a release agent applied over the susceptor, as this can protect against any chemical reaction between some metals and the susceptor.

A dehumidifier/heater may be added to control the temperature and humidity in the printer.

After printing the Mould may be cured to set the binder and expel moisture. This may be done with the application of heat (or UV in the case of DLP). The Mould cure may impact on its integrity which may be useful for a Reuseable Mould.

Feedstock

The step of Feedstock filling 106 in FIG. 1, may be implemented using a Feedstock hopper, vibration platform and a weigh scale.

Figure 8:
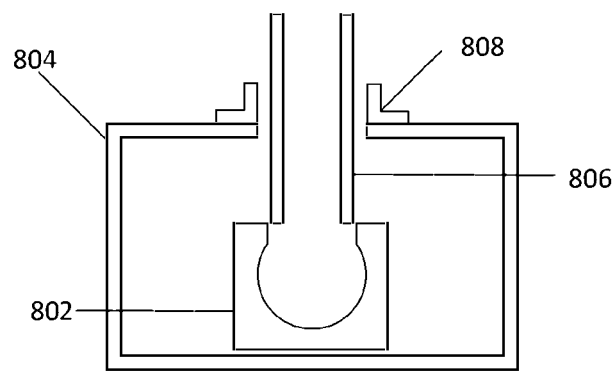
FIG. 8 is a cross sectional view of a combined filling station and Microwave

An alternative tube feed arrangement may be used as shown in FIG. 8. In this arrangement the Mould 802 may be filled while in the Microwave 804. A high temperature resistant tube 806 (which may also be microwave reflective or absorbing) is affixed to an aperture in the roof of the Microwave 804. The Mould 802 is positioned in the Microwave 804 under the tube 806 for filling and then subsequent heating. A waveguide 808 beyond the aperture cut-off ensures no radiation leaks. The tube 806 can be removeable and/or slidable so that different height moulds can be placed underneath it. Inert gas such as Argon gas may also be dispensed into the tube 806 to reduce oxidation. Additionally, an IR sensor may be directed down the tube 806 axis to measure the temperature of the melt directly.

The ability to flow will depend on the shape of the Feedstock particles (e.g., spherical, rough or flat are all possible) and the size of the particles from nano, to micro to pellets. With Ingots, the cold Feedstock will not flow into the Mould Impression. Ingots may be loaded into the hopper instead. Once the ingots in the hopper become molten, the feedstock will flow into the cavity and fill it. Susceptor around the Mould Impression may continue to heat the Feedstock so that it is remains molten until all sections are filled. Keeping the Feedstock molten until the Mould Impressions is filled may have advantages over the prior art which must rapidly fill the cavity before the feedstock solidifies. This may provide greater control of the Feedstock flow and/or improved quality of the Part. One or more Mould designs may help address an uneven fill, including the addition of a vibration table and designing a larger hopper in the mould to hold additional Feedstock to provide gravity assistance. Different Feedstocks will have different melting characteristics under different Wireless Power Sources and other factors including the shape and size of the particles. Spherical powder shapes of a certain size work well for most metal alloys. Aluminium may require a different approach due to its exceptionally high oxidation characteristics. A blend of different sizes and shapes of particles may be used to balance flow with meltability. Trace additives may act as a melt and/or flow catalyst or inhibit oxidization. An electronic scale may ensure the Mould is filled with the correct amount of Feedstock.

Melt Feedstock

The step of Melting the Feedstock 108 in FIG. 1, may be implemented using a Furnace, such as a Microwave.

The filled Mould is placed into the microwave. The internal metal shape of the Microwave may be used to ensure radiation is focused on an optimal melt and to ensure safe use. We can also employ a 'stirrer' that ensures an even spread of microwaves. The Mould's External Surface temperature may be measured which lets the Operator know if the Part is solidified and can be removed.

The Mould may be clamped during heating and cooling. After cooling the Operator may be able to open, easily release the Part and then close the Mould and secure the clamping system repeatedly (two or more times).

Figure 9:
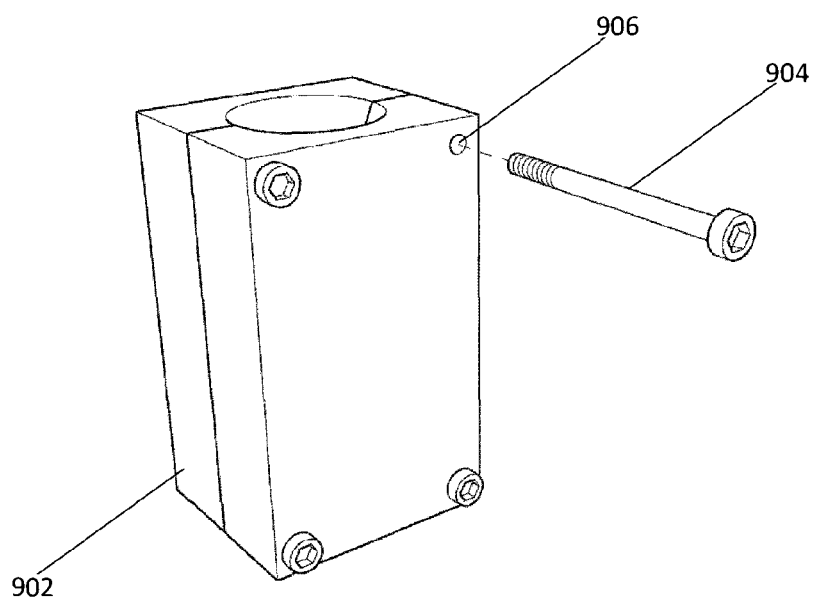
FIGS. 9 to 11 are perspective views of alternative clamping systems.
Figure 10:
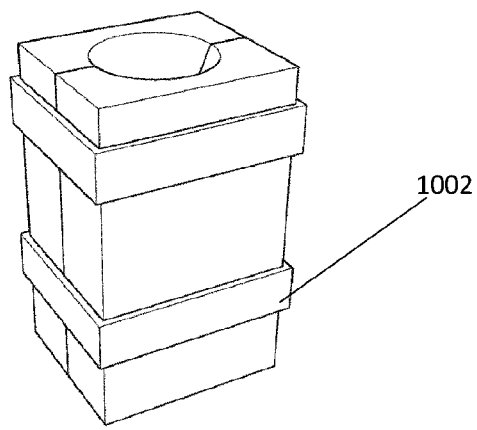
Figure 11:
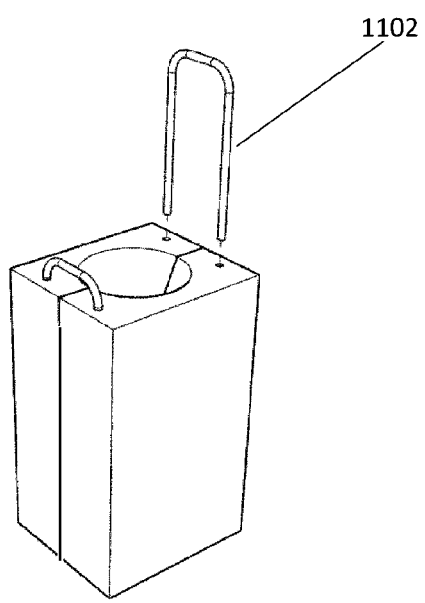

The clamping system could be either part of the Mould 902 as shown in FIG. 9 e.g., with ceramic bolts 904 going through specific holes 906), be independent as shown in FIG. 10 e.g., using a silicone band 1002 which would be reusable, or as shown in FIG. 11 e.g., using pins 1102 such as spring steel (with rounded ends) and be slightly tensioned, or be ceramic, or disposable e.g., high temp tape.

Also, it could be completely external like a feature in the floor of the Furnace, or a wedged box that holds the Mould together.

Figure 12:
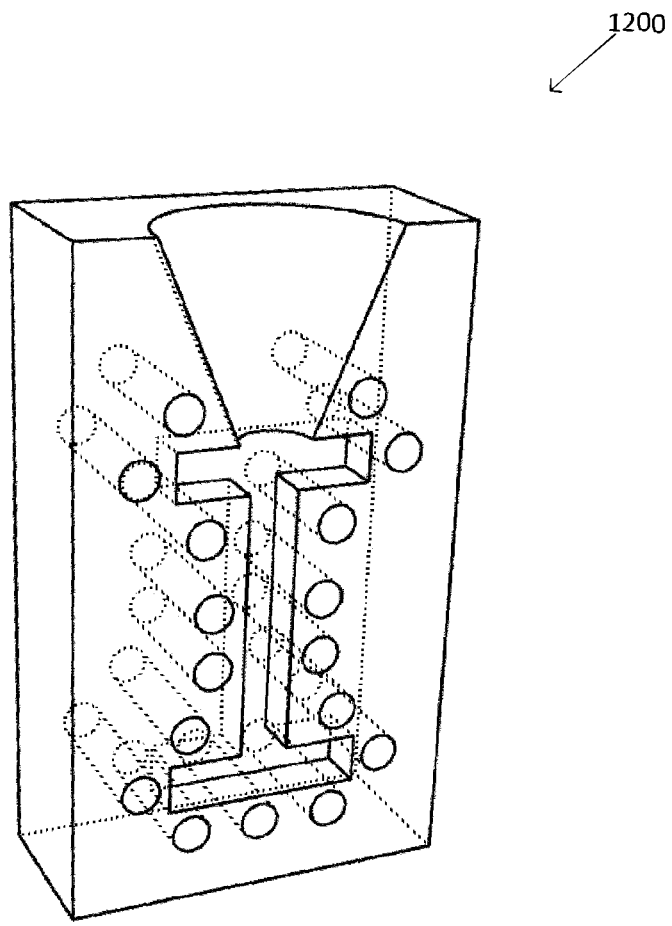
FIG. 12 is a cross sectional view of a mould with conformal cooling.

For metal Parts, the way Feedstock cools in the Mould may impact how the metal molecules are aligned and this may impact its strength characteristics i.e. tensile, shear, torsional, compression and hardness. Controlling the cooling of the metal part will allow parts of a desired strength profile. Conformal cooling in the Mould 1200 could be used to control cooling as shown in FIG. 12. Alternatively, selectively melting areas of the Mould and then moving the melt zone to another area may provide additional control. Forced air cooling may quickly cool the Mould while still in the Microwave. Forced air extraction and filtering (likely to be activated carbon) to remove any noxious fumes that may be released during the melt cycle may be useful.

Once the part has been cast it is allowed to cool to a safe temperature before being handled.

Remove Part

The step of Removing the Part from the Mould 112 in FIG. 1, may be implemented using an inspection station.

The clamping system is removed, and the Mould parts are separated. If the Mould is an Investment Mould—in which case it is physically removed (e.g. with a hammer or vibratory tool). The part is then pulled out of the Mould.

The funnel and any other casting artefacts are cut off—normally a hacksaw or handsaw. If required, the part is then sanded, filed, finished or polished to an acceptable surface finish. It may then be coated, painted or treated in some way.

The Mould is inspected (by eye or machine or with some calibration device) for damage. It is then closed (manually) and fastened together again and refilled with Feedstock before being placed back into the Furnace. If a long period of time has passed since the Mould was used, then it may require another cure cycle to remove any moisture that may be present. If the Mould fails the inspection, it is removed from production While the present invention has been illustrated by the description of the embodiments thereof, and while the embodiments have been described in detail, it is not the intention of the Applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of the Applicant's general inventive concept.

The invention claimed is:

1. A metal-casting mould comprising:
   an inorganic mould configured to receive metal feedstock; and
   a susceptor on or in the mould, the susceptor being configured for heating in situ to melt the feedstock,
   wherein the mould is 3D printed, and
   wherein the mould is reusable to cast two or more parts.

2. The mould of claim 1, wherein the susceptor is 3D printed, painted, or deposited after the mould is 3D printed.

3. The mould of claim 1, wherein the mould is a multipart mould.

4. The mould of claim 1, wherein the 3D printed mould comprises a ceramic and a binder.

5. The mould of claim 4, wherein the ceramic comprises silicon carbide.

6. The mould of claim 1, further comprising a hopper or funnel.

7. The mould of claim 6, wherein the hopper or funnel includes the susceptor.

8. The mould of claim 1, wherein the susceptor is silicon carbide, graphite, or magnetite.

9. The mould of claim 1, further comprising a release agent configured to assist removal of a part from the mould after the melted feedstock solidifies.

10. The mould of claim 1, wherein the heating in situ is provided using a wireless power source external to the mould.

11. The mould of claim 10, wherein the wireless power source is selected from a group consisting of a microwave transmitter, inductive power transmitter, capacitive or dielectric power transmitter, RF power transmitter and any combination thereof.

12. The mould of claim 1, wherein the feedstock is a metal with a melting point of less than 1000° C.

13. The mould of claim 12, wherein the low temperature metal feedstock includes at least a selection from a group consisting of Al, Fe, Mg, Zn, Si, Cu, Mn, Ni, Ti and any combination or alloy thereof.

14. The mould of claim 1, further comprising a binder selected from the group consisting of Sodium Silicate, inorganic colloidal solutions or high inorganic binders.

15. The mould of claim 1, further comprising a binder deposited from a print head.

16. The mould of claim 15, wherein the deposited binder is a further susceptor.

17. The mould of claim 1, wherein the mould has a maximum service temperature of 1000° C. or higher.

18. A 3D printer configured to print a mould according to claim 1.

19. A metal-casting mould comprising:
   an inorganic mould configured to receive metal feedstock; and
   a susceptor on or in the mould, the susceptor being configured for heating in situ to melt the feedstock,
   wherein the mould is reusable to cast two or more parts.

20. A metal-casting mould comprising:
   an inorganic mould configured to receive metal feedstock; and
   a susceptor on or in the mould, the susceptor being configured for heating in situ to melt the feedstock,
   wherein the mould is 3D printed,
   further comprising one or more conformal cooling channels within the mould configured to assist with cooling a part formed from the melted feedstock.

* * * * *

UNITED STATES PATENT AND TRADEMARK OFFICE
CERTIFICATE OF CORRECTION

PATENT NO. : 11,975,384 B2
APPLICATION NO. : 17/629324
DATED : May 7, 2024
INVENTOR(S) : David John Moodie et al.

It is certified that error appears in the above-identified patent and that said Letters Patent is hereby corrected as shown below:

In the Claims

Column 8, Line 34, Claim 14, cancel the text beginning with "14. The mould of claim 1," to and ending with "or high inorganic binders." in Column 8, Line 36, and insert the following claim:
--14. The mould of claim 1, further comprising a binder
selected from the group consisting of Sodium Silicate,
inorganic colloidal solutions or inorganic binders.--

Signed and Sealed this
First Day of October, 2024

Katherine Kelly Vidal
*Director of the United States Patent and Trademark Office*